(12) United States Patent
Yokota et al.

(10) Patent No.: US 6,558,276 B1
(45) Date of Patent: May 6, 2003

(54) METHOD OF MAKING A SOLID GOLF BALL

(75) Inventors: Masatoshi Yokota, Akashi (JP); Keiji Ohama, Akashi (JP)

(73) Assignee: Sumitomo Rubber Industries Limited, Hyogo-ken (JP)

( * ) Notice: Subject to any disclaimer, the term of this patent is extended or adjusted under 35 U.S.C. 154(b) by 0 days.

(21) Appl. No.: 09/393,814

(22) Filed: Sep. 10, 1999

(30) Foreign Application Priority Data

Sep. 28, 1998 (JP) .......................................... 10-273720

(51) Int. Cl.$^7$ ................................................ A63B 37/06
(52) U.S. Cl. ........................................ 473/377; 156/146
(58) Field of Search ................................. 473/373, 374, 473/377, 378, 367, 368, 371, 372

(56) References Cited

U.S. PATENT DOCUMENTS

| | | | |
|---|---|---|---|
| 5,252,652 A | * 10/1993 | Egashira et al. | ............ 473/377 |
| 5,795,247 A | * 8/1998 | Yokota et al. | ............ 473/374 |
| 5,919,101 A | * 7/1999 | Yokota et al. | ............ 473/374 |
| 5,929,171 A | * 7/1999 | Sano et al. | ............ 473/373 |

FOREIGN PATENT DOCUMENTS

| JP | 022972384 | 12/1990 |
|---|---|---|
| JP | 04109970 | 4/1992 |
| JP | 09122273 | 5/1997 |

* cited by examiner

Primary Examiner—Mark S. Graham
Assistant Examiner—Raeann Gorden
(74) Attorney, Agent, or Firm—Birch, Stewart, Kolasch & Birch, LLP

(57) ABSTRACT

Disclosed herein a solid golf ball comprising the core including a vulcanized rubber composition which contains 100 parts by weight of a base rubber, A parts by weight of an α, β-unsaturated carboxylic acid or a metal salt thereof, B parts by weight of an organic peroxide and C parts by weight of a sulfide compound. A, B and C satisfy the following relationship:

$$0.020 \times A \leq B + C \leq 0.050 \times A$$

and A is in the range from 25 to 45. It provides a solid golf ball giving improved feeling without impairing intrinsic resilience of the solid golf ball.

12 Claims, 1 Drawing Sheet

METHOD OF MAKING A SOLID GOLF BALL

BACKGROUND OF THE INVENTION

1. Field of the Invention

The present invention relates to a solid golf ball and, more particularly, to a solid golf ball having improved resilience on shot, flight performance and shot feeling.

2. Description of the Prior Art

Golf balls are classified into two categories. The one is a thread-wound golf ball which is obtained by winding a rubber thread around a center filled with a solid or liquid and then covering the rubber-thread wound center with a cover mainly made of balata or synthetic resin. The other one is a solid golf ball such as a one-piece golf ball and a multi-piece golf ball. A multi-piece golf ball is formed by covering a solid core with a thermoplastic resin cover. The solid core is a homogeneous solid spherical body, or consists of a central part and a layer or a plurality of layers placed on the central part (i.e. layered structure). The cover has a one- or multi-layered structure. A solid golf ball has been becoming popular because of its excellent flying distance and excellent durability, however a solid golf ball is inferior in shot feeling to a thread-wound golf ball because it is harder than a thread-wound golf ball.

The core of a conventional solid golf ball is produced by vulcanizing a rubber composition containing a polybutadiene rubber as a base rubber, a metal salt of an unsaturated carboxylic acid as a co-crosslinking agent, zinc oxide as a vulcanizing activator and a weight adjuster, an organic peroxide (e.g. dicumyl peroxide) as a vulcanizing initiator and other additives. The organic peroxide generates radicals and the radicals causes a crosslinking reaction of polybutadiene with the metal salt of an unsaturated carboxylic acid, the resulting solid golf ball has a proper hardness and durability and enhanced resilience. Although high resilience may give a long flying distance, hitting the solid golf ball having the hard core causes a large impact. A large impact on hitting gives an impression that it is difficult for unskilled or women golfers to hit the solid golf ball.

Proposals put forward for improving shot feeling by reducing the hardness of a solid golf ball. However, when the hardness of the core or cover is reduced, other problems occur, that is, the resilience of the solid golf ball is decreased and flying distance is shorter.

Japanese Unexamined Patent Publication Nos. 2-297384, 4-109970 and 9-122273 disclose solid golf balls whose cores are formed by vulcanizing a rubber composition containing an organosulfur compound. According to these disclosures, the solid golf ball may keep high resilience without increasing the hardness of the ball by adding the organosulfur compound. These disclosures indicated merely that the amount of the organosulfur compound based on the weight of the base rubber, however shot feeling and resilience is affected by not only the amount of the organosulfur compound based on the weight of the base rubber but also degree of crosslinking and the conditions of crosslinking in the core.

SUMMARY OF THE INVENTION

Under these circumstances, the present invention has been accomplished. An object of the present invention is to provide a solid golf ball giving excellent shot feeling without impairing intrinsic resilience of the solid golf ball.

In order to fulfil the above object, the present inventors have paid attention to the fact that shot feeling and resilience of the golf ball containing a core made from the vulcanized rubber has a close relation with the degree of crosslinking in the core and have found that the amount of an sulfide must be determined by taking the amount of the crosslinking system (base rubber, organic peroxide and α, β-unsaturated carboxylic acid or metal salt thereof) into consideration, thus completing the present invention.

According to an aspect of the present invention, a solid golf ball comprises a core being entirely made form a vulcanized rubber composition, and a cover covering the core. The rubber composition which contains 100 parts of a base rubber, A parts by weight of an α, β-unsaturated carboxylic acid or a metal salt thereof, B parts by weight of an organic peroxide, and C parts by weight of a sulfide, said A, B and C satisfying the following relationship:

$$0.020 \times A \leq B+C \leq 0.050 \times A$$

and A being in the range from 25 to 45.

Another solid golf ball of the present invention comprises a core consisting of a central part and a layer or a plurality of layers placed on said central part, and a cover covering said the core said central part or at least one layer being made from the vulcanized rubber composition as described above.

DESCRIPTION OF THE PREFERRED EMBODIMENTS

Figure 1:
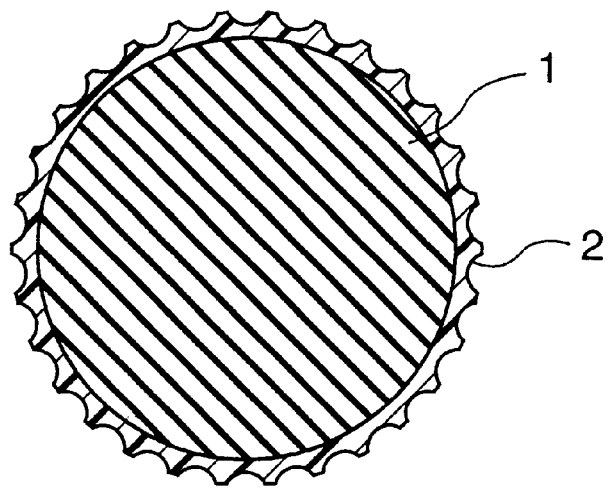
FIG. 1 is a schematic diagram illustrating the structure of two-piece golf ball according to one preferred embodiment of the present invention.

First, a rubber composition used in a solid golf ball of the present invention will be described.

The rubber composition includes a base rubber, an organic peroxide, an α, β-unsaturated carboxylic acid or a metal salt thereof, and a sulfide.

As the base rubber, a polybutadiene rubber is widely used, but not limited thereto. Preferred is a so-called high-cis polybutadiene rubber having a cis-1,4-bond of not less than 40%, more preferred is a cis-1,4-bond of not less than 80%, because polybutadiene having higher amount of the cis-1,4-bond can provide a vulcanized rubber having higher resilience. The other rubber, such as natural rubber, isoprene rubber, styrene-butadiene rubber, ethylene propylene rubber and the like may be mixed with polybutadiene rubber.

The organic peroxide is used as a crosslinking initiator because the organic peroxide is dissociated by heat to be converted into radicals, which can enhance a crosslinking reaction between the α, β-unsaturated carboxylic acid or metal salt thereof and the base rubber, thereby enhancing the resilience of the resulting solid golf ball. Good examples of the organic peroxide include dicumyl peroxide, 1,1-bis(t-butylperoxy)-3,3,5-trimethylcyclohexane, 2,5-dimethyl-2,5-di(t-butylperoxy)hexane, di-t-butyl peroxide and the like. Preferred is dicumyl peroxide.

The amount of the organic peroxide in the rubber composition is preferably 0.2 to 1.0 parts by weight per 100 parts by weight of the base rubber. When the amount of the organic peroxide is smaller than 0.2 parts by weight, the degree of crosslinking in the vulcanized rubber is insufficient to provide a solid golf ball having high resilience, thus it is difficult to obtain a solid golf ball giving a satisfactory flying distance. On the other hand, when the amount of the organic peroxide exceeds 1.0 parts by weight, the amount of the α, β-unsaturated carboxylic acid should be smaller so as to obtain a solid golf ball having a proper hardness, however the obtained golf ball has insufficient degree of crosslinking and insufficient resilience, resulting in reduced flying distance. More preferable lower limit is 0.3 parts by weight, while more preferable upper limit is not more than 0.8 parts by weight.

The α, β-unsaturated carboxylic acid and metal salt thereof is used as the co-crosslinking agent for vulcanization by peroxide, and an α, β-unsaturated carboxylic acid having 3 to 8 carbon atoms, such as acrylic acid and methacrylic acid, or a metal salt thereof is preferably used. The metal salt is a salt of di- or trivalent metal and is preferably zinc salt, magnesium salt or the like. A zinc acrylate or a zinc methacrylate is particularly preferred so as to impart excellent resilience to the resulting solid golf ball.

The amount of the α, β-unsaturated carboxylic acid or a metal salt thereof in the rubber composition is in the range from 25 to 45 parts by weight per 100 parts by weight of the base rubber. When the amount is smaller than 25 parts by weight, the hardness of the vulcanized rubber is insufficient to provide a solid golf ball having high resilience, thereby reducing flying distance of the resulting golf ball. On the other hand, when the amount is larger than 45 parts by weight, the vulcanized rubber is too hard to provide a solid golf ball giving satisfactory shot feeling. Preferable lower limit of the amount is 27 parts by weight and still more preferable limit is 29 parts by weight, while more preferable upper limit is 40 parts by weight and still more preferable upper arts by weight.

The sulfides in the rubber composition include diphenyl monosulfides represented by the following formula (1), diphenyl disulfides represented by the following formula (2), diphenyl polysulfides represented by the following formula (3), and morpholine disulfide represented by the following formula (4).

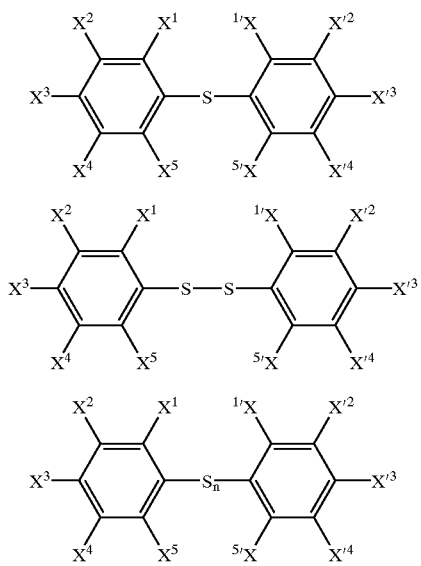

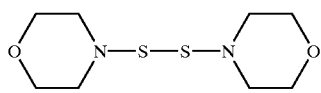

In the formulas (1) to (3), $X^1$ to $X^5$ and $X'^1$ to $X'^5$ are the same or different and each represents a halogen atom, an alkyl group, an acryloylthio group, a methacryloylthio group or a hydrogen atom. In addition, n in the formula (3) is an integer of 3 or 4.

The diphenyl monosulfides include dipheyl monosulfide wherein all of $X^1$ to $X^5$ and $X'^1$ to $X'^5$ are hydrogen atoms, symmetrical monosulfides (i.e. bis type), and asymmetrical monosulfides wherein $X^1$ to $X^5$ and $X'^1$ to $X'^5$ in correspondence each other are different. The diphenyl monosulfide and the bis type halogen-substituted phenyl monosulfide having a kind of halogen atom are preferably used. Examples of bis type halogen-substituted phenyl monosulfide having a kind of halogen atom include bis(fluorine-substituted phenyl) monosulfides such as bis(2-fluorophenyl) monosulfide, bis(2,5-difluorophenyl) monosulfide, bis(2,4,5-trifluorophenyl) monosulfide, bis(2,3,4,5-tetrafluorophenyl) monosulfide, and bis(pentafluorophenyl) monosulfide; bis(chlorine-substituted phenyl) monosulfides such as bis(2-chlorophenyl) monosulfide, bis(2,5-dichlorophenyl) monosulfide, bis(2,4,5-trichlorophenyl) monosulfide, bis(2,3,4,5-tetrachlorophenyl) monosulfide, and bis(pentachlorophenyl) monosulfide; and bis(bromine-substituted phenyl) monosulfides such as bis(2-bromophenyl) monosulfide, bis(2,5-dibromophenyl) monosulfide, bis(2,4,5-tribromophenyl) monosulfide, bis(2,3,4,5-tetrabromophenyl) monosulfide, and bis(pentabromophenyl) monosulfide. Bis type halogen-substituted phenyl monosulfide having with two or more kinds of halogen atoms, bis(methacryloylthio-substituted phenyl) monosulfide, and bis(acryloylthio-substituted phenyl) monosulfide may be also used. Examples of bis type halogen-substituted phenyl monosulfide having two or more kinds of halogen atoms include bis(2-fluoro-5-chlorophenyl) monosulfide, bis(2-fluoro-5-bromophenyl) monosulfide, bis(2,4-difluoro-5-chlorophenyl) monosulfide, bis(2,4-difluoro-5-bromophenyl) monosulfide, bis(2,4-dichloro-5-bromophenyl) monosulfide, bis(2-fluoro-4-chloro-5-bromophenyl) monosulfide, bis(2,4-difluoro-3,5-dichlorophenyl) monosulfide and bis(2,4,5-trifluoro-3-chlorophenyl) monosulfide and the like. Examples of bis (methacryloylthio-substituted phenyl) monosulfide include bis(2-methacryloylthiophenyl) sulfide, bis(3-methacryloylthiophenyl) sulfide, and bis(4-methacryloylthiophenyl) sulfide. Examples of bis (acryloylthio-substituted phenyl) monosulfide include bis(2-acryloylthiophenyl) sulfide, bis(3-acryloylthiophenyl) sulfide, bis(4-acryloylthiophenyl) sulfide.

The diphenyl disulfides include dipheyl disulfide wherein all of $X^1$ to $X^5$ and $X'^1$ to $X'^5$ are hydrogen atoms, symmetrical disulfides (i.e. bis type), and asymmetrical disulfides wherein $X^1$ to $X^5$ and $X'^1$ to $X'^5$ in correspondence each other are different. Preferred is a diphenyl disulfide and a bis type halogen-substituted phenyl disulfide having a kind of halogen atom. The former is the most preferable because of low cost. Examples of bis type halogen-substituted phenyl disulfide having a kind of halogen atom include bis(fluorine-substituted phenyl) disulfides such as bis(2-fluorophenyl) disulfide, bis(2,5-difluorophenyl) disulfide, bis(2,4,5-trifluorophenyl) disulfide, bis(2,3,4,5-tetrafluorophenyl)

disulfide, and bis(pentafluorophenyl) disulfide; bis(chlorine-substituted phenyl) disulfides such as bis(2-chlorophenyl) disulfide, bis(2,5-dichlorophenyl) disulfide, bis(2,4,5-trichlorophenyl) disulfide, bis(2,3,4,5-tetrachlorophenyl) disulfide, and bis(pentachlorophenyl) disulfide; and bis (bromine-substituted phenyl) disulfides such as bis(2-bromophenyl) disulfide, bis(2,5-dibromophenyl) disulfide, bis(2,4,5-tribromophenyl) disulfide, bis(2,3,4,5-tetrabromophenyl) disulfide, and bis(pentabromophenyl) disulfide. Examples of bis type halogen-substituted phenyl disulfide having two or more kinds of halogen atoms include bis(2-fluoro-5-chlorophenyl) disulfide, bis(2-fluoro-5-bromophenyl) disulfide, bis(2,4-difluoro-5-chlorophenyl) disulfide and bis(2,4-difluoro-5-bromophenyl) disulfide.

Examples of the diphenyl polysulfide include dibenzyl polysulfide, dibenzoyl polysulfide, dibenzothiazoyl polysulfide and dithiobenzoyl polysulfide.

The sulfide is liable to generate radicals by dissociation of a S—S bond or a C—S bond under heating. The radicals from sulfide has an influence on the crosslinking reaction between the base rubber and the α, β-unsaturated carboxylic acid, and results in providing a vulcanized rubber having high resilience without increasing its hardness. The vulcanized rubber can provide a solid golf ball giving a excellent shot feeling without decreasing a flying distance.

The amount of the sulfide in the rubber composition is preferably 0.2 to 1.0 parts by weight per 100 parts by weight of the base rubber. When the amount of the sulfide is smaller than 0.2 parts by weight, the vulcanized rubber shows no effect by adding the sulfide. When the amount exceeds 1.0 parts by weight, an influence on the organic peroxide becomes larger and the hardness of the vulcanized rubber is reduced, however the resulting solid golf ball is not improved in shot feeling. Moreover, the resilience of the vulcanized rubber is decreased, resulting in decreasing the flying distance of the produced solid golf ball.

According to the present invention, when the amount of the α, β-unsaturated carboxylic acid or metal salt thereof is A parts by weight, the amount of the organic peroxide is B parts by weight and the amount of the sulfide is C parts by weight, based on 100 parts by weight of the base rubber, the total amount of the organic peroxide and sulfide, i.e. "B+C" is 2.0% to 5.0% by weight based on the amount of the α, β-unsaturated carboxylic acid or metal salt thereof. This relationship is represented as follows:

$$0.020 \times A \leq B+C \leq 0.05 \times A$$

Preferable lower limit is not less than 2.5% by weight while preferable upper limit is 4.0% by weight, i.e. 0.025× A≦B+C0.04×A. More preferable lower limit is not less than 3.0% by weight, while preferred upper limit is 4.0% by weight, i.e. 0.03×A≦B+C≦0.04×A. When "B+C" is smaller than "0.02×A", the degree of crosslinking in the vulcanized rubber is insufficient to provide a solid golf ball having a high resilience and giving a long flying distance. When "B+C" is larger than "0.05×A" and "B" is larger than "C", the vulcanized rubber has too high degree of crosslinking, the resulting solid golf ball gives a poor shot feeling. When "B+C" is larger than "0.05×A" and "C" is larger than "B", the hardness of the vulcanized rubber becomes too low, resulting in reduced flying distance. Moreover the resulting solid golf ball gives a poor shot feeling despite of reducing the impact on shot because a large deformation of the ball on shot causes prolonged contact with a club head.

The rubber composition may further contain conventional additives such as weight adjusters, antioxidants, plasticizers, dispersants, ultraviolet absorbers, colorants, if necessary. As the weight adjuster, inorganic substances is widely used. Examples of weight adjuster for decreasing the specific gravity of the solid golf ball include zinc oxide, barium sulfate, calcium carbonate and the like. Zinc oxide is preferred because it can function as a vulcanization activator in a vulcanization step. Examples of weight adjuster for increasing the specific gravity of the golf ball include metal powder, metal oxide, metal carbide and metal nitride. Examples of metal include such as tungsten, molybdenum, lead, nickel, and copper. These weight adjusters can be used alone, or two or more kinds of them can be used in combination. The specific gravity of a solid golf ball may also be adjusted by mixing a weight adjuster for increasing specific gravity with a weight adjuster for decreasing specific gravity.

Figure 2:
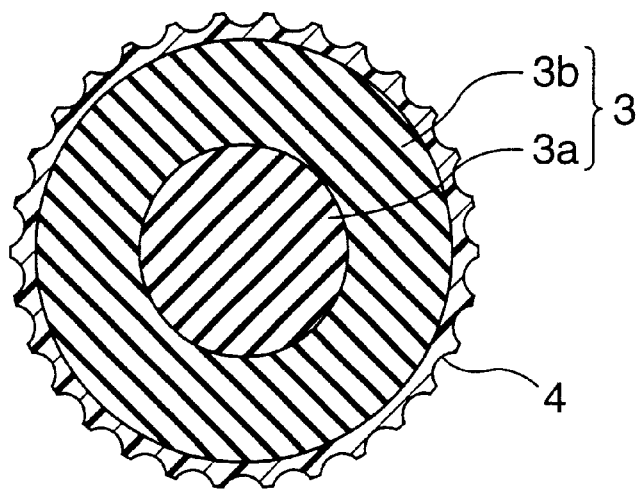
FIG. 2 is a schematic diagram illustrating the structure of three-piece golf ball according to another preferred embodiment of the present invention.

A solid golf ball of the present invention is a two-piece golf ball (shown in FIG. 1) or a multi-piece golf ball (e.g. three-piece golf ball shown in FIG. 2) wherein a core is made from the vulcanized rubber composition as described above. The two-piece golf ball as shown in FIG. 1 comprises the core 1 being homogeneous spherical body and the cover 2 covering the core 1, and the core 1 is entirely made from the vulcanized rubber composition. A multi-piece golf ball comprises the core having multi-layered structure (a central part and a layer or a plurality of layers placed on the central part) and a cover covering the core. A three-piece golf ball as shown in FIG. 2, one of typical embodiments of the multi-piece golf ball, comprises the core 3 consisting of the central part 3a and a layer 3b placed on the central part 3a, and the cover 4 covering the core 3. According to the present invention, the central part 3a or the layer 3b is made from the vulcanized rubber composition, in a preferred embodiment, both of the central part 3a and the layer 3b are made from the vulcanized rubber composition. When a multi-piece golf ball has the core consisting of the central part and a plurality of layers, the central part or at least one layer is made from the vulcanized rubber composition, preferably the central part, more preferably the central part and all layers are made from the vulcanized rubber composition.

Vulcanization of the rubber composition is conducted at 130–180° C. under a pressure of 30–100 kg/cm² for 15 to 60 minutes, but it is not limited thereto.

An outer diameter of the core is preferably from 32.0 to 40.5 mm, and more preferably from about 35.0 to 40.0 mm. This is because the solid golf ball comprising the core having too small diameter and a thick cover layer cannot effectively make use of excellent resilience of the core. On the other hand, the solid golf ball comprising the core having too large diameter and a thin cover layer is liable to damage to the cover, resulting in inferior durability of the solid golf ball.

According to the present invention, the core deforms 2.7 mm to 3.3 mm when applying a load ranging from 10 kg as an initial load to 130 kgf as a final load to the core, and preferably deforms from 2.8 to 3.2 mm. When the amount of deformation of the core is smaller than 2.7 mm, the core is too hard to give a good shot feeling. When the amount of deformation is larger than 3.3 mm, resilience of the core is not sufficient to obtain a satisfactory flying distance.

The surface hardness of the core of the golf ball of the present invention is preferably from 75 to 90, and more preferably from 78 to 88 in the terms of JIS-C hardness.

JIS-C hardness is a hardness measured by by using a spring type hardness tester, model C, according to JIS-K6301. When the surface hardness of the core is smaller than 75, the resulting solid golf ball has low resilience. When the surface hardness of the core is larger than 90, the resulting solid golf ball is poor in shot feeling because of too hard core.

The cover is molded about the above-mentioned core. The cover may have a multi-layered structure, but a single-layer structure is preferred in view of the productivity.

The cover is made from a thermoplastic resin, preferably an ionomer resin or a mixture thereof. An ionomer is a copolymer of α-olefin with a metal salt of an α, β-unsaturated carboxylic acid. Preferred examples of the α-olefin are ethylene and propylene, and preferred examples of the α, β-unsaturated carboxylic acid are acrylic acid and methacrylic acid. Examples of the metal ion for neutralizing the carboxyl group include alkali metal ion such as Na ion, K ion and Li ion; divalent ion such as Zn ion, Ca ion and Mg ion; and trivalent ion such as Al ion and Nd ion, and these ions may be used alone or two or more kinds of them in combination. Among these metal ions, Na ion, Zn ion and Li ion are particularly preferred so as to enhance the durability and resilience of the core.

Specific examples of preferred ionomer resin include SURLYN 1605, SURLYN 1706 and SURLYN 1707 (manufactured by Du Pont Co.); HIMILAN 1557, HIMILAN 1605, HIMILAN 1652, HIMILAN 1705, HIMILAN 1706, HIMILAN 1707, HIMILAN 1855 and HIMILAN 1856 (manufactured by Mitsui Du Pont Polychemical Co.); and IOTEC 7010 and IOTEC 8000 (manufactured by Exxon Co.), but are not limited thereto.

The thermoplastic resin for cover may contain fillers such as barium sulfate, colorants such as titanium dioxide, dispersants, antioxidants, ultraviolet absorbers, photostabilizers, fluorescent agents and fluorescent brighteners in a proper amount.

The method of molding a cover about the core is not specifically limited, and the cover may be formed by a conventional method such as a compression molding operation and an injection moldings operation. Compression molding uses two preformed half-shells of the resin for cover which are positioned about the core in a mold at about 130–170° C. under pressure for about 1 to 15 minutes. Injection molding forces the resin for cover around the core. When the cover is composed of plural layers, each layer may be formed in the same manner.

On cover molding, dimples or brambles may be formed onto the surface of the cover. After molding of cover, painting or marking is applied as necessary.

EXAMPLE

The present invention is further illustrated by the following examples. It is to be understood that the present invention is not limited to the examples, and various changes and modifications may be made in the invention without departing from the spirit and scope thereof.

Evaluation Method

First, the evaluation method used in the following examples will be described.

(1) Amount of Deformation of a Core (mm)

A core is applied a load of 10 kgf as initial load to 130 kgf as final load and the amount of deformation of the core was measured. The smaller amount of deformation indicates that the core is harder.

(2) Coefficient of Restitution

A cylindrical metal object of 198.4 g was collided against a solid golf ball at a speed of 40 m/second and a velocity of the cylindrical object and that of the ball after collision were measured, and then the coefficient of restitution of the golf ball was calculated from the respective velocities and weights.

(3) Shot Feeling

Ten professional golfers hit a solid golf with a driver (#W1) and they evaluated whether the shot feeling is excellent or not. The results were judged by the following criteria.

○: Eight or more golfers evaluated the shot feeling excellent.

Δ: Four to seven golfers evaluated the shot feeling excellent.

X: Three or less golfers evaluated the shot feeling excellent.

As used herein, "shot feeling" refers to not only impact when hitting the golf ball, but also general impression on shot. The golfer would have bad shot feeling in the case that when being shot, the ball stays longer time in contact with the club head due to a deformation of the ball.

(4) Flying Distance (yard)

A golf club (#W1) was mounted on a swing robot manufactured by True Temper Co., and a golf ball was hit with the golf club at a head speed of 45 m/sec and the flying distance was measured.

(5) Surface Hardness of a Core

Surface hardness of the vulcanized rubber composition for core was measured by using a spring type hardness tester, model C, according to JIS-K6301.

Production of Golf Balls

A core having a homogeneous solid sphere structure and a diameter of 39.0 mm was formed by vulcanizing a rubber composition in a mold at 157° C. under a pressure of 100 kgf/cm$^2$ for 30 minutes. The rubber composition for cores was prepared by uniformly mixing components of the formulation shown in Table 1. The resulting core was evaluated for the surface hardness and the amount of deformation according to above-mentioned methods. Then, a composition for covers as described below was injected around each core to produce solid golf balls Nos. 1 to 6 having an outer diameter of 42.7 mm. The solid golf balls Nos. 1 to 3 satisfied that the total amount of the organic peroxide and sulfide is within a range from 2.0 to 5.0% by weight based on the amount of zinc acrylate, i.e. $0.02 \times A \leq B+C \leq 0.05 \times A$, and the amount of zinc acrylate is within a range from 25 to 45 parts by weight, thus they are corresponding to examples of the present invention and solid golf balls Nos.4 to 6 are corresponding to comparative examples.

The composition for cover was prepared by mixing 5 parts by weight of HIMILAN 1555 (trade name of ethylene-methacrylic acid copolymer neutralized with sodium ion), 95 parts by weight of HIMILAN 1855 (trade name of ethylene-methacrylic acid copolymer neutralized with zinc ion, sold by Mitsui Du Pont Polychemical Co.), 3 parts by weight of titanium dioxide and 1 part by weight of barium sulfate.

The produced golf balls Nos.1 to 6 were evaluated for the coefficient of restitution, flying distance and shot feeling in accordance with the above-mentioned methods. The results and the formulation of the rubber composition for cores are shown in Table 1.

TABLE 1

| Ball No. | | 1 | 2 | 3 | 4 | 5 | 6 |
|---|---|---|---|---|---|---|---|
| Core Formulation (Parts by weight) | Butadiene rubber | 100 | 100 | 100 | 100 | 100 | 100 |
| | Zinc acrylate: A | 29 | 32 | 36 | 22 | 32 | 34 |
| | Zinc oxide | 18.3 | 17.3 | 16.2 | 21.0 | 17.1 | 17.4 |
| | Dicumyl peroxide: B | 0.5 | 0.5 | 0.5 | 0.5 | 0.3 | 0.5 |
| | Diphenyl disulfide: C | 0.3 | 0.5 | 0.9 | 0.5 | 0.3 | 1.5 |
| | 0.02 × A | 0.58 | 0.64 | 0.72 | 0.44 | 0.64 | 0.68 |
| | 0.05 × A | 1.45 | 1.60 | 1.80 | 1.10 | 1.60 | 1.70 |
| | B + C | 0.80 | 1.00 | 1.40 | 1.00 | 0.60 | 2.00 |
| Properties | Core Amount of deformation | 3.1 | 2.9 | 2.8 | 3.8 | 2.9 | 3.2 |
| | Surface hardness | 78 | 82 | 84 | 75 | 81 | 78 |
| | Ball Coefficient of restitution | 100 | 101 | 102 | 96 | 98 | 97 |
| | Flying distance | 230 | 232 | 232 | 225 | 228 | 227 |
| | Shot feeling | ⊚ | ⊚ | ⊚ | × | Δ | Δ |

Solid golf ball No. 4 was too soft, because the degree of crosslinking was small due to small amount of zinc acrylate. Therefore, the ball No.4 deformed larger and had small resilience, resulting in reducing the flying distance and inferior shot feeling due to prolonged contact between the ball and the club head.

Solid golf ball No.5 contains the same amount of zinc acrylate as that of solid golf ball No. 2. However, as for No.5, the amount of the organic peroxide and sulfide based on the amount of zinc acrylate was small, resulting in lowering the resilience regardless of small decrease in hardness, moreover resulting in shorter flying distance than No.2. Furthermore, No.5 was poor in shot feeling comparing with No.2.

The amount of zinc acrylate of No. 6 was within a range of the present invention, but the amount of diphenyl disulfide was too large based on the amount of zinc acrylate. The hardness of No.6 was smaller than that of No.2 regardless of the amount of zinc acrylate of No.6 being greater than that of No.2. Therefore, No.6 was decreased in resilience due to a decrease in degree of crosslinking, resulting in reducing the flying distance. Furthermore, No.6 was poor in shot feeling due to deformed easier.

On the other hand, the golf balls Nos. 1 to 3 could inhibit increasing the hardness in proportion to the amount of zinc acrylate by the effect of a proper amount of sulfide. Therefore, Nos.1 to 3 gave an excellent shot feeling without reducing the flying distance.

As described above, sulfide can inhibit increasing the hardness due to an increase in degree of crosslinking. According to the present invention, since the amount of the crosslinking system is determined by taking the amount of sulfide into consideration in the rubber composition for cores, a solid golf ball giving improved shot feeling without impairing the intrinsic resilience and flying distance of the solid golf ball can be obtained.

The present invention has been described with reference to the preferred embodiments. Obviously, modifications and alterations will occur to others upon reading and understanding the proceeding detailed description. It is intended that the present invention be construed as including all such modifications and alterations insofar as they come within the scope of the attended claims or the equivalents thereof.

What is claimed is:

1. A method of making a solid golf ball having improved shot feeling, resilience and flying distance, which comprises in a golf ball mold vulcanizing a rubber composition into a core, said rubber composition containing:

A parts by weight of α, β-unsaturated carboxylic acid or a metal salt thereof,

B parts by weight of an organic peroxide, and

C parts by weight of a bis type halogen-substituted phenyl disulfide represented by the formula:

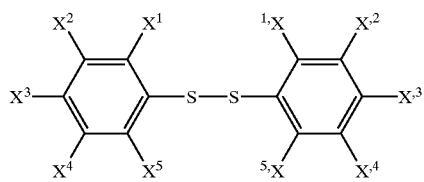

wherein $X^1$ to $X^5$ and $X'^1$ to $X'^5$ are each independently hydrogen or halogen, and wherein the weights of A, B, and C in a base rubber with 100 parts rubber by weight are determined by the relation $0.020 \times A \leq B+C \leq 0.040 \times A$ wherein A is in the range from 25 to 45.

2. A method of making a solid golf ball according to claim 1 wherein B is in the range from 0.2 to 1.0.

3. The method of making the solid golf ball according to claim 1, wherein a surface hardness of the core is in the range from 75 to 90 in terms of JIS-C hardness.

4. The method of making the solid golf ball according to claim 1, wherein the core is deforming from 2.7 mm to 3.3 mm when applying a load ranging from 10 kg as an initial load to 130 kg as a final load to the core.

5. The method of making the solid golf ball according to claim 1, wherein C is in the range from 0.2 to 1.0.

6. The method of making the solid golf ball according to claim 1, wherein the core has a diameter of 32.0 to 40.5 mm.

7. A method of making a solid golf ball comprising the steps of:

(a) making a core consisting of a central part and a layer or a plurality of layers placed on the central part, and (b) placing a cover covering the core, wherein the central part or at least one layer is made from a vulcanized rubber composition that contains A parts by weight of α, β-unsaturated carboxylic acid or a metal salt thereof, B parts by weight of an organic peroxide, and
C parts by weight of a bis type halogen-substituted phenyl disulfide represented by the formula:

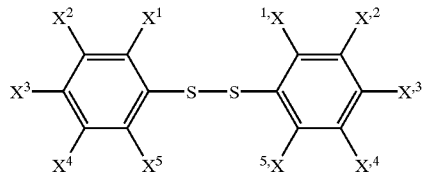

wherein $X^1$ to $X^5$ and $X'^1$ to $X'^5$ are each independently hydrogen or halogen, and
wherein the weights of A, B, and C in a base rubber with 100 parts rubber by weight are determined by the relation
$0.020 \times A \leq B+C \leq 0.040 \times A$ wherein
A is in the range from 25 to 45.

8. The method of making the solid golf ball according to claim 7, wherein a surface hardness of the core is in the range from 75 to 90 in terms of JIS-C hardness.

9. The method of making the solid golf ball according to claim 7, wherein a surface hardness of the core is in the range from 75 to 90 in terms of JIS-C hardness.

10. The method of making the solid golf ball according to claim 7, wherein the core is deforming from 2.7 mm to 3.3 mm when applying a load ranging from 10 kg as an initial load to 130 kg as a final load to the core.

11. The method of making the solid golf ball according to claim 7, wherein C is in the range from 0.2 to 1.0.

12. The method of making the solid golf ball according to claim 7, wherein the core has a diameter of 32.0 to 40.5 mm.

* * * * *